(12) United States Patent
Knopp

(10) Patent No.: US 7,622,429 B2
(45) Date of Patent: Nov. 24, 2009

(54) NON-EMULSIFYING ANTI-SLUDGE COMPOSITION FOR USE IN THE ACID TREATMENT OF HYDROCARBON WELLS

(75) Inventor: Malcolm Stuart Knopp, St. Albert (CA)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 12/367,588

(22) Filed: Feb. 9, 2009

(65) Prior Publication Data
US 2009/0181868 A1 Jul. 16, 2009

Related U.S. Application Data

(63) Continuation of application No. 11/256,230, filed on Oct. 21, 2005, now Pat. No. 7,507,695.

(51) Int. Cl.
*C08K 8/584* (2006.01)
(52) U.S. Cl. .................................. 507/255; 507/259
(58) Field of Classification Search ................ 507/255, 507/259
See application file for complete search history.

(56) References Cited

U.S. PATENT DOCUMENTS

| 2,854,477 | A | * | 9/1958 | Steinhauer | 562/75 |
| 5,622,921 | A | * | 4/1997 | Dyer | 507/259 |
| 6,192,987 | B1 | * | 2/2001 | Funkhouser et al. | 166/304 |
| 6,346,279 | B1 | * | 2/2002 | Rochon | 424/616 |

* cited by examiner

*Primary Examiner*—Randy Gulakowski
*Assistant Examiner*—Alicia M Toscano
(74) *Attorney, Agent, or Firm*—Howrey LLP

(57) ABSTRACT

A composition for inhibiting or preventing the formation of emulsions and asphaltic sludges in the presence of treating acids during the acid stimulation of hydrocarbon wells is provided. The composition includes an alkyl aryl sulfonic acid or salt thereof, an acetylenic alcohol, an alkyl diphenyl oxide sulfonic acid or derivative thereof, in an alkyl alcohol solvent. The disclosed compositions can be used in an acid treatment solution, such as 15% hydrochloric acid, to prevent and resolve live acid and spent acid emulsions for a wide range of crude oils.

11 Claims, No Drawings

NON-EMULSIFYING ANTI-SLUDGE COMPOSITION FOR USE IN THE ACID TREATMENT OF HYDROCARBON WELLS

CROSS REFERENCE TO RELATED APPLICATIONS

The present application is a continuation patent application of U.S. patent application Ser. No. 11/256,230, filed Oct. 21, 2005, the contents of which are incorporated herein by reference in its entirety.

BACKGROUND OF THE INVENTION

The present invention relates generally to compositions for preventing iron and acid induced sludge formation and emulsion formation during acidizing treatments of crude hydrocarbon wells.

A common practice to increase production from a crude oil or gas well involves an acid stimulation treatment of the well. Acid stimulation of a well involves the pumping downhole of an aqueous acid solution which reacts with the subterranean hydrocarbon containing formations, such formations usually consisting of limestone or sand, to increase the size of the pores within the formations and provide enlarged passageways for the crude hydrocarbons to more freely move to collection points which otherwise would be obstructed. Unfortunately, during such acidizing operations, asphaltene precipitates may form which block the existing and newly formed passageways and reduce the efficacy of the acidizing treatment. The formed asphaltic sludges vary in appearance depending on the types and amounts of acid additives used, the amount and state of iron present, and the nature of the crude.

In addition, crude hydrocarbons often contain chemicals that may stabilize an emulsion formed upon contact and mixing under shear conditions with the aqueous acid during an acid stimulation treatment. Emulsions so formed are often stable for many hours and present the possibility of forming emulsion blocks within the formation under bottom hole conditions. Such emulsions are undesirable because of the significant increase in the viscosity of the mixed crude and pumped fluids, with the result of impeded flow into and out from the well bore. Also, stable acid/crude emulsions are often formed from mixing the crude oil and spent acid.

Many additives and chemical compositions exist which are classified as anti-sludgers, non-emulsifiers or demulsifiers, mutual solvents, iron controllers, or corrosion inhibitors. For example, U.S. Pat. No. 5,622,921 ('921 patent), which is incorporated by reference herein in its entirety, discloses the use of various additives that may be included in the acidizing solution to minimize sludge and emulsion formation in the hydrocarbon/acid solution. In particular, the '921 discloses a composition for controlling sludge and emulsion formation, the composition including a mixture of an anionic alkyl aryl sulfonic acid or sulfonate combined with nonethoxylated glycols and acetylenic alcohols in an alkyl alcohol solvent.

While known compositions are effective for reducing sludge and emulsion formation for some types of crude hydrocarbons and pumping conditions, they do not consistently perform well with the wide variety of crudes and conditions encountered in the field. In particular, known compositions do not resolve live acid and spent acid emulsions for some crude oils. "Live acid" refers to the acid solution at full strength; that is, as it is pumped into the formation (i.e. prior to reaction with carbonates, dolomite, limestone, etc.). "Spent acid" refers to solution after it has reacted with the well formation. For example, a live acid solution may be 15% hydrochloric acid, with the spent acid solution being 1% hydrochloric acid. It is important for emulsion control to prevent the formation of emulsions under both the live and spent conditions While such currently used techniques and acidizing mixtures have achieved varying degrees of success, the current treatments have failed to produce consistently the necessary emulsion control for both live and spent acid conditions. It is, therefore, a purpose of the present invention to provide new and useful compositions for inhibiting or preventing the formation of emulsions in the presence of treating acids during the acid stimulation of hydrocarbon wells.

SUMMARY OF THE INVENTION

A composition for inhibiting or preventing the formation of emulsions in the presence of treating acids during the acid stimulation of hydrocarbon wells is provided. The composition includes an alkyl aryl sulfonic acid or salt thereof, an acetylenic alcohol, an alkyl diphenyl oxide sulfonic acid or derivative thereof, in an alkyl alcohol solvent. More specifically, a preferred embodiment of the disclosed composition includes dodecyl benzenesulfonic acid in the range of about 35 to about 45 percent by volume, propargyl alcohol in the range of about 7.5 to about 12.5 percent by volume, alkyl diphenyl oxide sulfonic acid or a derivative thereof in the range of about 5 to about 10 percent by volume, in methanol. The disclosed compositions can be used in an acid treatment solution, such as 15% hydrochloric acid, to prevent and resolve live acid and spent acid emulsions for a wide range of crude oils.

DETAILED DESCRIPTION OF PRESENT INVENTION

The compositions of the present invention provide a novel acid antisludge and corrosion inhibitor system that also effectively resolves live acid and spent acid emulsions for a wide range of crude oils. The present invention is especially useful in resolving live acid and spent acid emulsions formed where a high level of acid treatment solution (greater than 3% in 15% hydrochloric acid, for example) is required to supply the appropriate level of antisludge properties to the acid formulation.

In the preferred composition, methanol is used as the diluting phase for the antisludge/non-emulsifier system. Other solvents can be utilized, including non-ethoxylated glycols such as dipropylene glycol and other alkyl alcohol solvents such as ethanol, isopropanol and other monohydric alcohols. Methanol, however, is preferred because it provides a cheaper means for providing liquidity and freeze protection to the resultant formulation.

Also in the preferred composition, dodecylbenzene sulfonic acid (DDBSA) is utilized as the acid antisludge agent. One of skill in the art should appreciate that other anionic surfactants such as other alkyl aryl sulfonic acid or sulfonates can also be utilized as an acid antisludge agent. Mixtures of such anionic surfactants can also be incorporated into the present compositions. Anionic surfactants help to stabilize the crude hydrocarbon by preventing polar immunities from catalyzing polymerization of the colloidally dispersed asphaltene component of the hydrocarbon stream. The acid antisludge agent, preferably DDBSA, is included in the present compositions in the range between about 30 percent by volume and about 60 percent by volume of the total volume of the composition, and preferably between about 40 percent by volume and about 50 percent by volume of the composition.

Also in the preferred composition, propargyl alcohol is utilized as the acid corrosion inhibitor. One of skill in the art should appreciate that other acetylenic alcohols, such as acetylenic diols, butynol, pentynol, hexynol, octynol, and mixtures thereof, can also be utilized as an acid corrosion inhibitor. The acid corrosion inhibitor, preferably propargyl alcohol, is included in the present compositions in the range between about 5 percent by volume and about 15 percent by volume of the composition, and preferably between about 7.5 percent by volume and about 12.5 percent by volume of the composition.

Also in the preferred composition, an alkyl diphenyl oxide sulfonic acid derivative is utilized as an effective emulsion breaking agent for live and spent acid/crude oil emulsions. The preferred alkyl diphenyloxide sulfonic acid derivative is a Dowfax-type material having a hexyl alkyl group, which for example is supplied by Rayn/Ayr under the trade name SAAD. The alkyl diphenyloxide sulfonic acid derivative also provides coupling of the acid additives in the acid solution and provides acid package stability at 100° C.+ for more than 5 hours. The alkyl diphenyloxide sulfonic acid derivative is included in the present compositions in the range between about 2.5 percent by volume and about 12.5 percent by volume of the composition, and preferably between about 5 percent by volume and about 10 percent by volume of the composition. For hard to treat acid/crude oil emulsions, additional SAAD may be added to the acid formulation to improve emulsion resolution without any detriment to the antisludge and/or coupling properties of the acid formulation.

One advantage of the compositions of the present invention is the ability to effectively resolve live and/or spent emulsions with various crude oils when formed by mixing the two under shear conditions, and within a broad range of ratios. Another advantage of the compositions of the present invention is the stability of the compositions at reasonably high bottom hole temperatures, such as 80-95° C. or higher, and specifically the resistance to chemical additives "oiling out" at such high bottom hole temperatures within 12-40 minutes. Such compositions are also homogenous at sub-zero Celsius temperatures. The present invention also offers a versatile "all in one drum" formulation of acid corrosion inhibitor, antisludge agent, and non-emulsifier that provides easy and accurate field mixing of aqueous acid blends.

The following example is included to demonstrate the use of a preferred composition of the present invention. It should be appreciated by those of skill in the art that the techniques disclosed in the example which follows represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE

A proposed formulation of the present invention is:

| DDBSA | 42.85 vol. % |
|---|---|
| Propargyl alcohol | 10.00 vol. % |

-continued

| SAAD | 7.14 vol. % |
|---|---|
| Methanol | 40.01 vol. % |

The above formulation, as tested, which included a wide variety of low to high API gravity crude oils and condensates, was incorporated at 3.5% concentration into a 15% hydrochloric acid system. Iron control agents were also included at an iron control level of 5000 ppm ferric ion, a typical ratio for controlling ferric iron contamination during field operations, as follows:

| Nowferr 1 | 21 kg/m$^3$ |
|---|---|
| Nowferr 14P | 0.8 kg/m$^3$ |
| Nowferr 12 | 3.5 l/m$^3$ |

No emulsions or asphaltic sludge were apparent. Corrosion rates after 6 hours at 85° C. using J-55 metal coupons were 0.003-0.011 lbs/ft$^2$, which is within acceptable industry limits.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A non-emulsifying anti-sludge composition for use in the acid treatment of hydrocarbon wells, comprising:
    about 30 to 60 percent by volume of an alkyl aryl sulfonic acid or salt thereof having an alkyl group in the range from 8 to 14 carbon atoms;
    an acetylenic alcohol;
    alkyl diphenyl oxide sulfonic acid or derivative thereof in the range of about 2.5 to about 12.5 percent by volume;
    in an alkyl alcohol solvent.

2. The composition of claim 1, wherein the alkyl aryl sulfonic acid is dodecyl benzenesulfonic acid.

3. The composition of claim 1, wherein the alkyl aryl sulfonic acid is in the range of about 30 to 60 percent by volume, the acetylenic alcohol is in the range of about 5 to about 15 percent by volume, and the alkyl diphenyl oxide sulfonic acid or derivative thereof is in the range of about 2.5 to about 12.5 percent by volume.

4. The composition of claim 1, wherein the acetylenic alcohol is propargyl alcohol.

5. The composition of claim 1, wherein the alkyl diphenyl oxide sulfonic acid or derivative thereof is a material having a hexyl alkyl group.

6. The composition of claim 1, wherein the alkyl alcohol solvent is an alkyl monohydric alcohol.

7. The composition of claim 1, wherein the alkyl alcohol solvent is methanol.

8. The composition of claim 1, wherein the composition is anionic.

9. A non-emulsifying anti-sludge composition for use in the acid treatment of hydrocarbon wells, comprising:
an anionic composition comprising:
dodecyl benzenesulfonic acid in the range of about 40 to about 50 percent by volume;
propargyl alcohol in the range of about 7.5 to about 12.5 percent by volume;
alkyl diphenyl oxide sulfonic acid or derivative thereof in the range of about 5 to about 10 percent by volume;
in an alkyl alcohol solvent.

10. The composition of claim 9, wherein the alkyl diphenyl oxide sulfonic acid or derivative thereof is a material having a hexyl alkyl group.

11. The composition of claim 9, wherein the alkyl alcohol solvent is methanol.

\* \* \* \* \*